(12) United States Patent
Kolehmainen et al.

(10) Patent No.: US 7,432,624 B2
(45) Date of Patent: Oct. 7, 2008

(54) ROTOR FOR A PERMANENT-MAGNET ELECTRICAL MACHINE AND A MACHINE FOR MANUFACTURING IT

(75) Inventors: Jere Kolehmainen, Merikaarto (FI); Jari Pekola, Vantaa (FI); Jouni Ikaheimo, Kurikka (FI)

(73) Assignee: ABB OY, Helsinki (FI)

( * ) Notice: Subject to any disclaimer, the term of this patent is extended or adjusted under 35 U.S.C. 154(b) by 0 days.

(21) Appl. No.: 10/525,973

(22) PCT Filed: Aug. 26, 2003

(86) PCT No.: PCT/FI03/00621

§ 371 (c)(1),
(2), (4) Date: Aug. 25, 2005

(87) PCT Pub. No.: WO2004/019467

PCT Pub. Date: Mar. 4, 2004

(65) Prior Publication Data
US 2006/0103335 A1 May 18, 2006

(30) Foreign Application Priority Data
Aug. 26, 2002 (FI) .................................. 20021524

(51) Int. Cl.
*H02K 1/27* (2006.01)

(52) U.S. Cl. ............................ 310/156.57; 310/156.53; 310/156.56

(58) Field of Classification Search ................................ 310/156.49–156.61, 51–61
See application file for complete search history.

(56) References Cited

U.S. PATENT DOCUMENTS

| 4,658,165 | A | * | 4/1987 | Vanderschaeghe | 310/156.57 |
| 4,685,202 | A | * | 8/1987 | Booth et al. | 29/607 |
| 5,255,425 | A | * | 10/1993 | Kanno | 29/596 |
| 5,386,161 | A | * | 1/1995 | Sakamoto | 310/49 R |
| 5,763,967 | A | * | 6/1998 | Kurosawa et al. | 310/45 |
| 5,962,944 | A | * | 10/1999 | Narita et al. | 310/156.53 |

(Continued)

FOREIGN PATENT DOCUMENTS

DE 198 51 883 A1 5/2000

(Continued)

OTHER PUBLICATIONS

Japanese Office Action, dated Aug. 21, 2007, corresponding to Japanese Patent Application No. 2004-530293 and English-translation thereof.

*Primary Examiner*—Tran Nguyen
(74) *Attorney, Agent, or Firm*—Buchanan Ingersoll & Rooney PC

(57) ABSTRACT

The object of the invention is a rotor (4) for a permanent-magnet electrical machine, comprising an axle (6) mounted to the machine body with bearings, a rotor pack made of iron and arranged around the axle (6), as well as permanent magnets (10) adapted to the rotor pack, used for forming the magnetic poles (9) of the rotor. According to the invention, the rotor poles (9) contain a slot (24) extending from both edges of the pole (9) essentially towards the centre of the pole; the slot (24) is closer to the outer circumference (3) of the rotor than the central axle of the rotor. The invention also includes a method for manufacturing such a rotor.

20 Claims, 3 Drawing Sheets

U.S. PATENT DOCUMENTS

Figure 1:
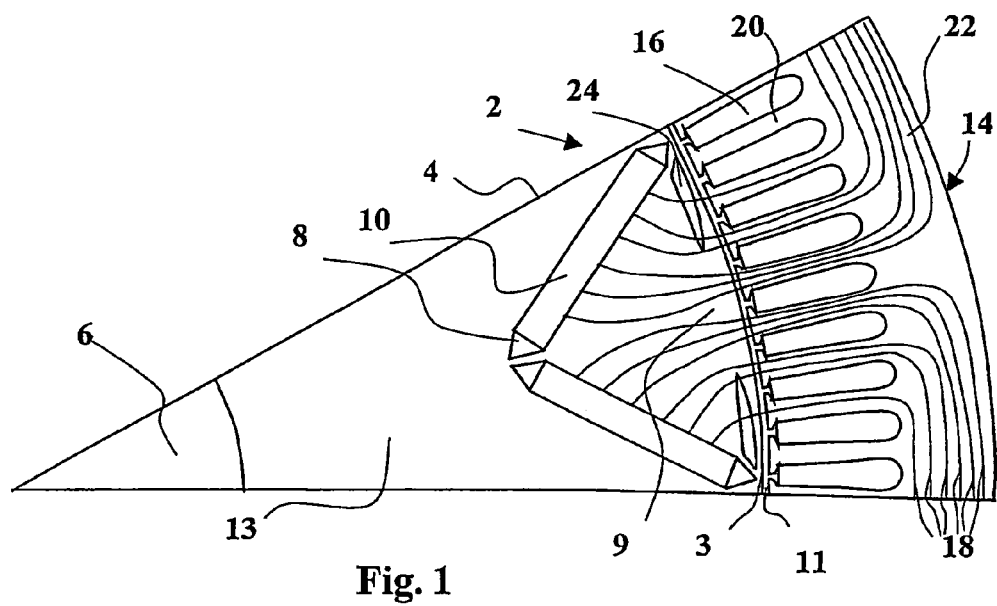

| | | | | |
|---|---|---|---|---|
| 5,990,593 | A * | 11/1999 | Narita et al. | 310/156.53 |
| 6,008,559 | A * | 12/1999 | Asano et al. | 310/156.53 |
| 6,268,677 | B1 * | 7/2001 | Takabatake et al. | 310/156.55 |
| 6,274,960 | B1 * | 8/2001 | Sakai et al. | 310/156.02 |
| 6,285,104 | B1 * | 9/2001 | Nashiki | 310/184 |
| 6,351,050 | B1 * | 2/2002 | Coles | 310/156.53 |
| 6,396,374 | B1 * | 5/2002 | Asano et al. | 335/284 |
| 6,437,473 | B1 * | 8/2002 | Mobius et al. | 310/156.21 |
| 6,552,462 | B2 * | 4/2003 | Sakai et al. | 310/156.78 |
| 6,577,022 | B2 * | 6/2003 | Joong et al. | 290/40 C |
| 6,956,312 | B2 * | 10/2005 | Inayama et al. | 310/156.41 |
| 2002/0140308 | A1 * | 10/2002 | Inayama et al. | 310/156.47 |
| 2002/0171309 | A1 * | 11/2002 | Wakui et al. | 310/156.48 |
| 2002/0175585 | A1 * | 11/2002 | Tagome et al. | 310/156.56 |

FOREIGN PATENT DOCUMENTS

| | | |
|---|---|---|
| DE | 199 15 664 A1 | 10/2000 |
| EP | 0 955 714 A2 | 11/1999 |
| FR | 2 636 480 | 3/1990 |
| JP | 05-304737 | 11/1993 |
| JP | 08-251891 | 2/1996 |
| JP | 11-220846 | 8/1999 |
| JP | 11-252840 | 9/1999 |
| JP | 2002-034185 | 1/2002 |

* cited by examiner

ROTOR FOR A PERMANENT-MAGNET ELECTRICAL MACHINE AND A MACHINE FOR MANUFACTURING IT

The object of the invention is a rotor for a permanent-magnet electrical machine according to the introduction part of claim 1. The object of the invention also includes a method for manufacturing a rotor according to the introduction part of claim 11.

The breakaway torque of an electrical machine is proportional to the air gap flux and the armature circuit current. It is essential for the operation of the machine that the breakaway torque must be uniform in all load conditions. The air gap flux induces a current in the armature circuit, used for measuring feedback quantities required for machine control. The quantities under measurement must be accurate and free of interference. The position of a rotor in a permanent-magnet electrical machine, such as a permanent-magnet synchronous machine controlled by a frequency converter, is often calculated on the basis of the stator current In this case, it is essential for operational reliability that the current must be free of interference. Incorrect or uncertain feedback information will interfere with the control logic and the control of switches in the frequency converters.

The aim is to make the air gap flux in an AC machine or a similar electrical machine to be as accurately sinusoidal as possible. It is well known that this is hampered by issues such as slot harmonics caused by windings and disturbance factors due to the location of magnets and the shape of permanent-magnet poles. Permanent-magnet poles have been shaped by placing the permanent magnets appropriately and designing a suitable shape for the sheet pack that forms the magnet circuit of the rotor. For example, a solution is known from the patent application EP 0955714 where the outer circumference of a permanent-magnet rotor has a shape that causes the air gap width to vary sinusoidally within the pole area so that the air gap is at its minimum at the centre of the pole and increases towards the edges of the pole. The disadvantage of this functional solution is that it causes manufacturing problems in large and slow machines with a large rotor diameter and several pairs of poles, for example 12 poles.

A solution is also known, for example from the publication JP 2001-037127, where the air gap flux is controlled by means of radial slots in the rotor sheet pack, intended to direct the magnetic flux into the air gap with a distribution that is as sinusoidal as possible. However, slots that extend almost to the outer circumference of the rotor do not guarantee an air gap flux that would change smoothly, in a sinusoidal form.

The purpose of this invention is to create a new permanent-magnet motor that would be economical to manufacture for all dimensioning requirements and that would achieve an air gap smoothly following a sinusoidal form. In order to achieve this, the rotor according to the invention is characterised by the features specified in the characteristics section of claim 1. Correspondingly, the method according to the invention is characterised by the features specified in the characteristics section of claim 11. Other preferred embodiments of the invention are characterised by the features listed in the dependent claims.

The variation of the air gap flux in a solution according to the invention essentially follows a sinusoidal form. The sinusoidality of the air gap flux in rotors with a large diameter and several poles can also be ensured by a means that is economical in terms of manufacturing technology. It is sufficient to die-cut or laser-cut appropriate slots in the rotor sheets, eliminating the need for shaping the outer circumference of the rotor which is challenging in terms of manufacturing technology. The solution according to the invention keeps the air gap flux essentially sinusoidal also in load conditions.

The invention provides a preferred implementation particularly in terms of manufacturing technology. In addition, the invention is applicable as such to electrical machines of different sizes and types.

The fundamental idea of the invention is based on modifying the effective air gap without actually changing the structure that forms the air gap in the machine—that is, the outer circumference of the rotor or the inner circumference of the stator. The structure according to the solution has only a minor effect on the distribution of magnetic flux within the rotor sheet pack, because in the direction of the flux lines, the slots present a break perpendicular to the short flux line which will not disrupt the flux lines.

According to an embodiment of the invention, the slots in the rotor are located at a distance from the outer circumference of the rotor pack. According to another embodiment, the permanent magnets are positioned in a V shape so that the magnets extend to the vicinity of the outer circumference of the rotor and that the magnets forming a single pole are closer to each other at the axle end than at the outer circumference end.

According to yet another embodiment, the slot extends from the edge of the pole towards the centre of the pole, essentially parallel with the outer circumference of the rotor.

According to a preferred embodiment, the width of the slot in the rotor sheet pack decreases in the radial direction of the rotor towards the centre of the rotor magnetic pole. Thus the effective air gap is increased to essentially correspond to a sinusoidally changing air gap width.

According to an embodiment, the slots are curved at the centre of the pole from the outer circumference of the rotor towards the axle. Manufacturing technology does not allow the manufacture of very narrow slots, such as ones narrower than 0.5 mm, and for this reason, sinusoidality at the centre of the pole is further ensured by increasing the distance between the additional air gap and the actual air gap. Thus the flux becomes curved in a way that optimises the distribution in the air gap.

According to an embodiment, the slot extends from the edge of the pole essentially towards the centre of the pole on the outer circumference of the rotor. In this case the distance between the slot and the air gap may be larger but the slot is still essentially perpendicular to the flux direction and, in this embodiment as well, the effect of increased air gap is directed towards the edges of the pole rather than the centre, which makes it possible to achieve a sinusoidal form. This embodiment is particularly applicable to die-cut manufacturing, because the slot may be larger and its shape is regular. However, the effect of the slot on air gap flux distribution is appropriately reduced by the fact that the slot is at a larger distance from the air gap.

According to a preferred embodiment, several slots are arranged to extend from both edges of the pole towards the centre of the pole, so that the effective increase in air gap is composed of several slots. In addition, the slots at the same edge of the pole are located at intervals from each other in the radial direction of the rotor and at least one slot at both edges of the pole is essentially parallel with the outer circumference of the rotor. This is particularly applicable to laser cutting technique where it is preferred to make slots of a limited width, such as slots in the range of 0.5 to 1.5 mm.

According to a further developed embodiment, the slots closer to the outer circumference of the rotor are wider and/or longer than the slots farther away from the outer circumference of the rotor.

According to yet another embodiment, the permanent magnets are located on the surface of the outer circumference of the rotor and the slots are arranged inside the rotor at the positions of the permanent magnets in terms of the radial direction of the rotor.

According to yet another embodiment, the ridge between the magnet and the air gap is increased at the edge of the pole. In this case, the magnetic flux will close to the pole beside the ridge, making the air gap flux density between the poles essentially zero.

Figure 2:
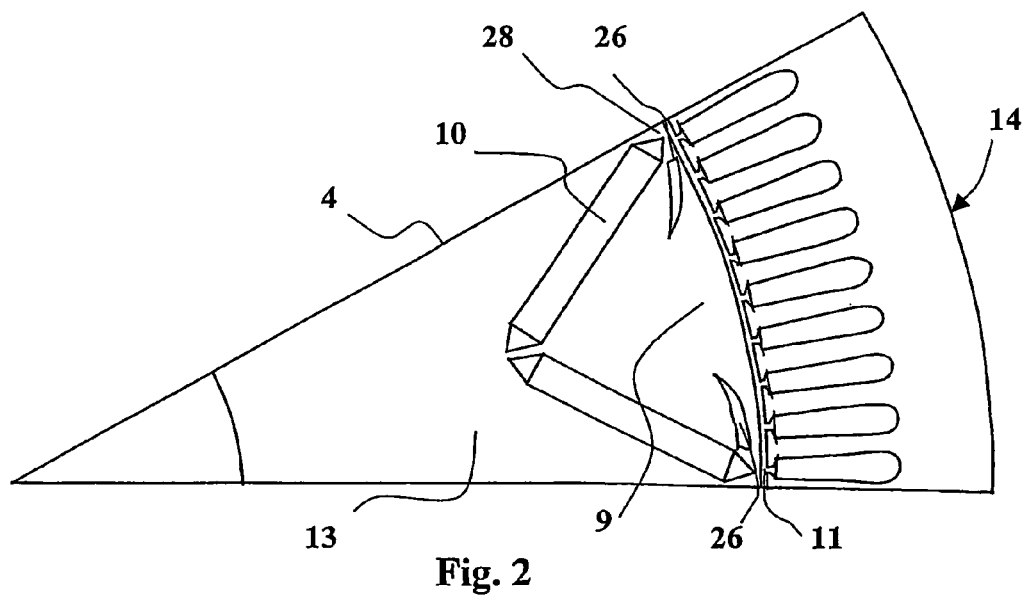
Figure 3:
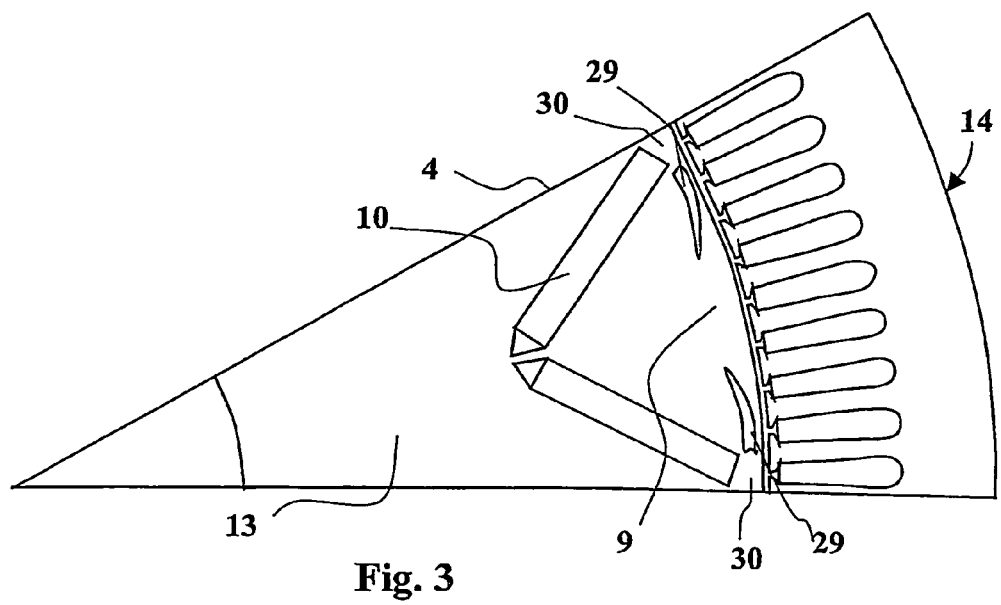
Figure 4:
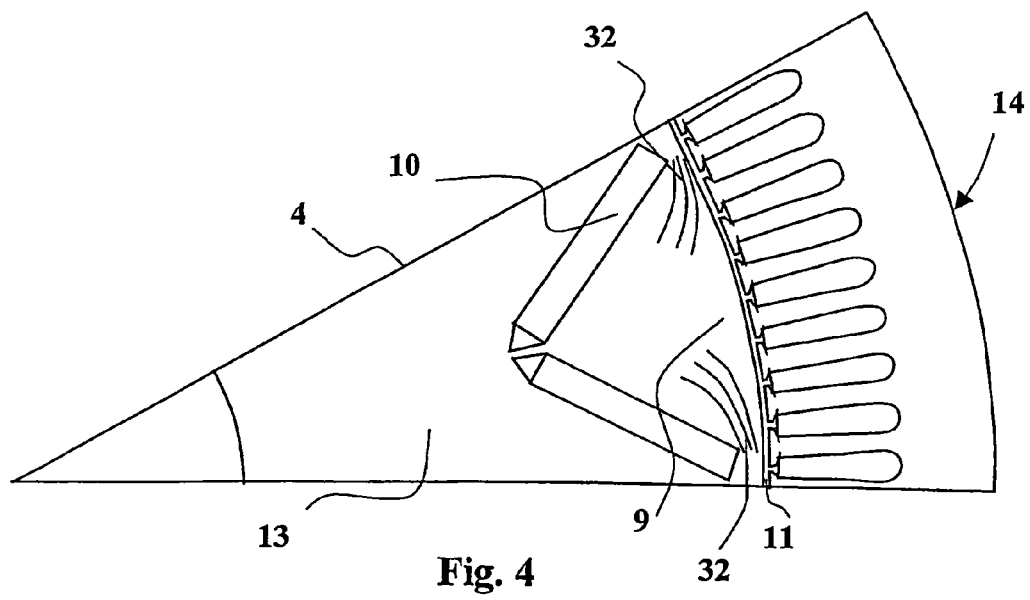
Figure 5:
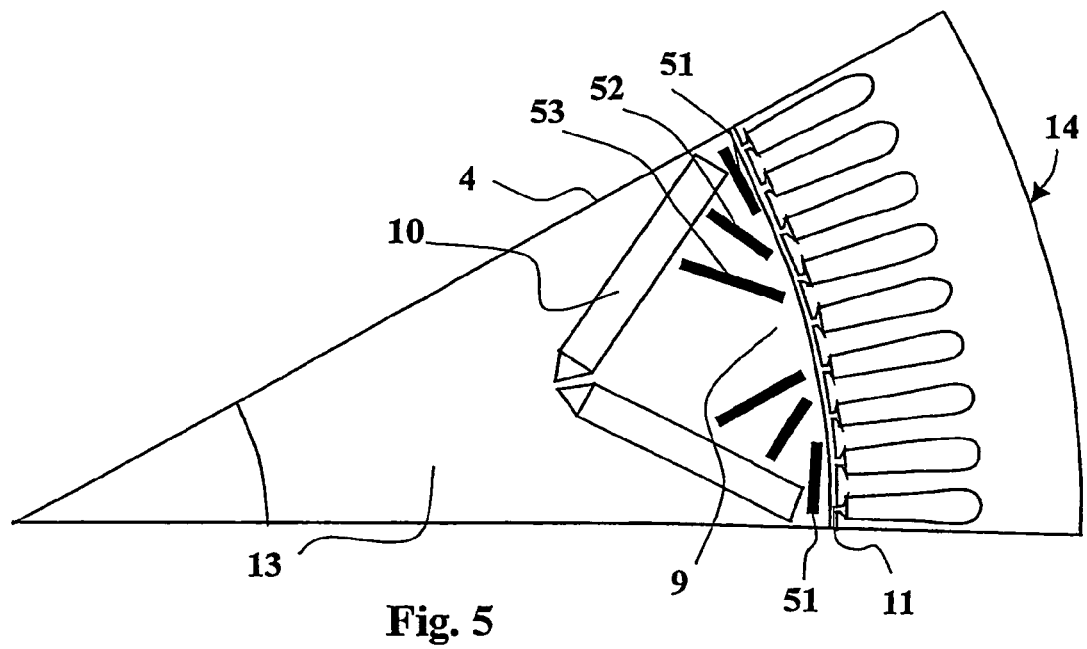
Figure 6:
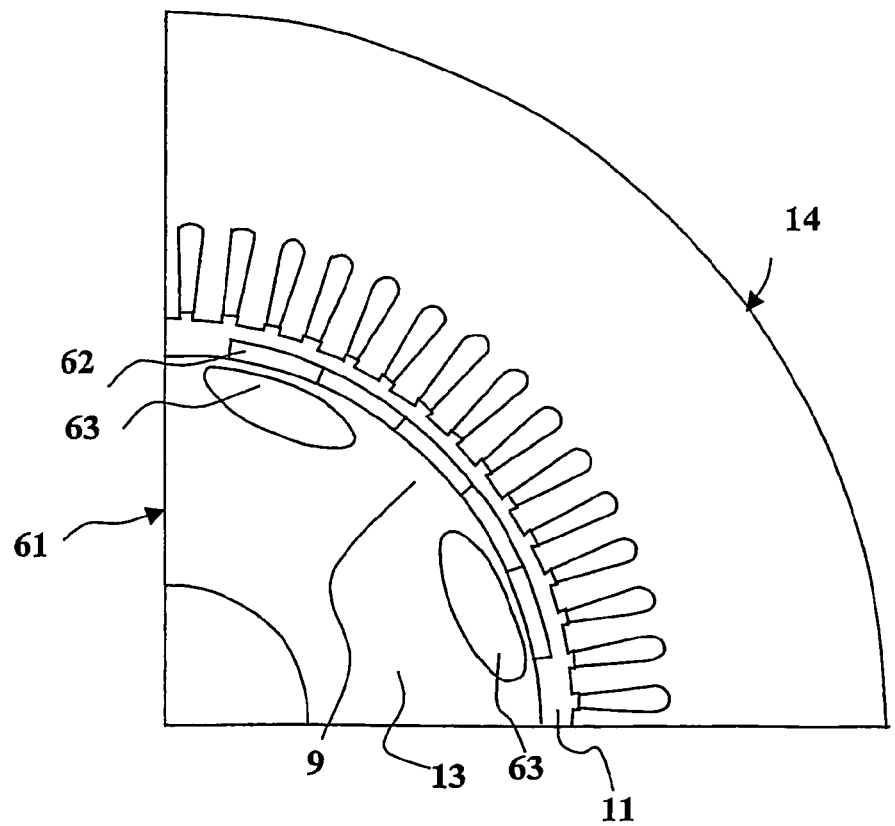

In the following, the invention will be described in detail with the help of certain embodiments by referring to the enclosed drawings, where FIG. 1 illustrates the cross section of a rotor according to the invention, FIG. 2 illustrates the cross section of a rotor according to a second embodiment of the invention, FIG. 3 illustrates the cross section of a rotor according to a third embodiment of the invention, FIG. 4 illustrates the cross section of a rotor according to a fourth embodiment of the invention, FIG. 5 illustrates the cross section of a rotor according to a fifth embodiment of the invention, FIG. 6 illustrates the cross section of a rotor according to a sixth embodiment of the invention.

The FIGS. 1 to 5 illustrate a solution according to the invention in a permanent-magnet synchronous machine 2, where the magnets are embedded within the rotor. The machine is illustrated as a cross-sectional view in the axle direction, and the Figures contain identical reference numbers for parts corresponding to each other. The machine according to the example includes twelve magnetic poles; for clarity, only a sector illustrating a single pole is included here. The other poles are implemented similarly, with the exception that the magnetic pole alternates in a known way such that every other pole is an N pole and every other pole is a S pole. The rotor 4 in the machine 2 is assembled of magnetically conductive sheets, and the resulting rotor pack is adapted to the axle 6 of the machine. The rotor sheets contain slots 8 made by die-cutting, for example, and permanent magnet elements 10 are located in the slots. The permanent magnets are arranged in a V shape so that the magnets on both sides of a single pole 9 are close to each other in the rotor section towards the axle and essentially at the edges of the magnetic pole 9 in the vicinity of the outer circumference of the rotor. The outer circumference 3 of the rotor is essentially cylindrical. Even though the FIGS. 1 to 5 show a magnetic pole formed of two magnets in a V shape, the magnetic pole can be formed in many other ways in applications of the present invention. For example, there may be two magnets radially located at the edges of the pole, leaving the bottom of the "V" open in a sense, or the pole may be formed of three magnets, two at the edges of the pole and one between these, parallel with the outer circumference of the rotor. Furthermore, the permanent magnets may form a W shape or there may be several permanent magnets arranged in a sequence.

The stator 14 of the machine is formed of magnetically conductive sheets where grooves 16 have been cut for stator windings (not shown). As shown in FIG. 1, the magnetic flux closes through the route illustrated by the flux lines 18: rotor magnet 10—rotor pole 9—air gap 11—stator teeth 20—stator back 22 and further (not shown) the stator teeth located at an adjacent pole—air gap—another rotor pole—another rotor magnet—rotor back 13—rotor magnet 10. The magnetic flux lines tend to bend in the air gap so that the magnetic flux density in the air gap deviates from sinusoidal form. This is affected by magnet locations, route of flux in the teeth and stray fluxes. One method of changing the air gap flux to a more sinusoidal direction is modifying the rotor generator. For example, in the solution described in the patent application EP 0955714, the outer circumference of the rotor is arranged so that the air gap is at its minimum at the centre of the pole and at its maximum at the edges of the pole.

In the embodiment illustrated in FIG. 1, the rotor pole contains slots 24 essentially parallel with the outer circumference of the rotor, extending from the edges of the pole towards the centre of the pole so that the slot is widest at the edge of the pole. The slot becomes narrower towards the centre of the pole, and its length in the direction of the outer circumference is approximately one-third of the pole width. The slot, whose width is approximately 1.5 millimeters at its minimum, can be created by die-cutting the sheets forming the rotor pack before assembling the pack. When the slot is near the air gap of the machine, its effect on the distribution of the air gap flux is almost similar to the shape of the outer circumference of the rotor. The slots are arranged symmetrically on both edges of the pole.

Because the width of the slot cannot evenly decrease to zero, there is a slotless section at the centre of the pole with a width of approximately one-third of total pole width, causing a deviation from sinusoidal form in the distribution of air gap flux. This effect is reduced by the solution illustrated in FIG. 2, where the slots 26 have been die-cut so that they curve towards the centre of the rotor when moving towards the centre of the pole.

For mechanical reasons the thickness of the rotor sheet pack must be sufficient on the edge of the pole at the location of the ridge 28 between the magnet and the air gap, for which reason the slot may not extend to the actual edge of the pole. In this case, the distribution of the air gap flux tends to deviate from sinusoidal form. To solve this problem, the embodiment illustrated in FIG. 3, which contains a slot 29 at a distance from the end of the permanent magnet, has a ridge 30 between the rotor poles so large that the flux goes directly to the adjacent pole, not to the stator teeth and the stator windings fitted in the grooves between them. In this case, the voltage induced in the stator winding varies essentially sinusoidally.

According to a fourth embodiment, as illustrated in FIG. 4, the rotor contains several slots 32 arranged sequentially in the flux direction—that is, the radial direction of the rotor. The slots preferably become narrower from the edges of the pole towards the centre. The slots are also curved towards the rotor axle, so that the distance from the slots to the outer circumference of the rotor, and thus to the air gap of the machine, becomes larger when moving away from the edge of the pole. In this embodiment the width of the slots may be smaller than in the example illustrated in FIG. 1, so that laser-cutting is a suitable method for making the slots. The distribution of the flux close to the air gap can be fine-tuned by increasing the curvature of one or more slots, which has a corresponding effect on the air gap flux.

The idea of the present invention is that the route of the magnetic flux contains slots in the rotor and the flux must go over these slots. As described in connection with the embodiments illustrated in FIGS. 1 to 4, the effect on air gap flux distribution is larger if the slot is closer to the air gap and if it is wider—that is, the effect is proportional to the length of the air gap formed by the slot in the direction of the flux. In the embodiment illustrated in FIG. 5, the slots are arranged so that they steer the flux inside the iron part of the pole at a distance from the air gap. Thus the slots are arranged to extend from essentially close to the permanent magnet element towards the centre of the pole in the air gap. The first slot 51 in particular extends from the air gap end of the permanent magnet element almost parallel with the outer circumference of the rotor. The second slot 52 extends from the side of the permanent magnet element, at a distance of approximately one-fifth of the element length, towards the air gap at one-sixth of the pole. The third slot 53 extends from the middle of the permanent magnet element towards the intersection of approximately one-third of the pole and the air gap.

FIG. 6 illustrates an embodiment where the invention is applied to a motor with magnets on the surface of the rotor, a so-called surface magnet solution. The rotor 61 is built of sheets die-cut to a circular form, for example, and permanent magnets 62 are fitted on the outer circumference 3 of the rotor. In order to control the air gap flux, the rotor contains slots 63, for example die-cut in the sheets before assembly, so that at the edges of the pole, the slots are close to the permanent magnets, and the dimension of the slots in the direction of the magnetic flux lines—that is, perpendicular to the permanent magnet—is larger at the edges of the pole than at the end of the slot towards the centre of the pole. Because the magnetic flux seeks the shortest route for closure, the magnetic flux density decreases at the edges of the permanent magnets and the air gap flux becomes closer to sinusoidal form. Particularly in this embodiment the back section 13 of the rotor may be made of solid iron, in which case the slots can be made by drilling appropriate axial holes in the rotor.

In the above, the invention has been described with the help of certain embodiments. However, the description should not restrict the scope of patent protection, but the embodiments may vary within the framework of the claims presented below.

The invention claimed is:

1. A rotor for a permanent-magnet electrical machine, comprising:
   an axle mounted to the machine with bearings;
   a rotor pack made of iron and arranged around the axle; and
   permanent magnets adapted to the rotor pack, the permanent magnets forming a plurality of magnetic poles and being configured to maximize magnetic flux density at the respective centers of the plurality of magnetic poles and decrease the magnetic flux density towards the respective edges of the plurality of magnetic poles, wherein:
   each of the plurality of magnetic poles have a first edge and a second edge located close to the outer circumference of the rotor, and slots in the rotor on the route of the magnetic flux extending from close to the first and second edges essentially towards the center of each of the plurality of magnetic poles, and
   the slots are closer to the outer circumference of the rotor than the central axle of the rotor.

2. A rotor according to claim 1, wherein:
   the slots are located at a distance from the outer circumference of the rotor.

3. A rotor according to claim 1, wherein:
   the permanent magnets are arranged in a V-shape so that the magnets extend to the vicinity of the outer circumference of the rotor and that the magnets forming a single pole are closer to each other at the end towards the axle than at the end towards the outer circumference.

4. A rotor according to claim 1, wherein:
   the slots extend from the first and second edge towards the center of each of the plurality of magnetic poles essentially parallel with the outer circumference of the rotor.

5. A rotor according to claim 1, wherein:
   the width of at least one slot decreases towards the center of each of the magnetic poles.

6. A rotor according to claim 1, wherein:
   the ends of at least one the slots are located towards the center of each of the magnetic poles is curved towards the axle.

7. A rotor according to claim 1, wherein:
   the slots extend from the edge of the pole essentially towards the center of each of the magnetic poles are on the outer circumference of the rotor.

8. A rotor for a permanent-magnet electrical machine, comprising:
   an axle mounted to the machine with bearings:
   a rotor pack made of iron and arranged around the axle; and
   permanent magnets adapted to the rotor pack, the permanent magnets forming a plurality of magnetic poles and being configured to maximize magnetic flux density at the respective centers of the plurality of magnetic poles and decrease the magnetic flux density towards the respective edges of the plurality of magnetic poles, wherein:
   each of the plurality of magnetic poles have a first edge and a second edge located close to the outer circumference of the rotor, and slots in the rotor on the route of the magnetic flux extending from close to the first and second edges essentially towards the center of each of the plurality of magnetic poles, and the slots are closer to the outer circumference of the rotor than the central axle of the rotor, wherein:
   there are several slots extending from the first and second edges of the pole towards the center of each of the magnetic poles, so that the slots on the same edges of the poles are located at an interval from each other in the radial direction of the rotor and that at least one slot on both edges of each of the magnetic poles are essentially parallel with the outer circumference of the rotor.

9. An arrangement according to claim 8, wherein:
   the slots closer to the outer circumference of the rotor are wider and/or longer than the slots farther away from the outer circumference of the rotor.

10. A rotor according to claim 1, wherein:
    the permanent magnets are located on the surface of the outer circumference of the rotor and that the slots are arranged inside the rotor at the positions of the permanent magnets in terms of the radial direction of the rotor.

11. A method for manufacturing a permanent-magnet electrical machine to provide an air gap flux having a sinusoidal form, said electrical machine comprising an axle mounted to the machine body with bearings, with said method comprising:
    arranging a plurality of rotor poles around the axle, said plurality of rotor poles being made of magnetically conductive iron;
    adapting permanent magnets to the rotor; and
    forming axial slots in the rotor within at least one of the plurality of rotor poles, the slots being close to the outer circumference of the rotor, and extending from close to a first edge and a second edge towards the center of the at least one of the at least one of the plurality of rotor poles.

12. A method according to claim 11, wherein:
    the slots are formed by die-cutting.

13. A method according to claim 11, wherein:
    the slots are formed using a laser.

14. A method according to claim 11, wherein:
    the slots are formed by drilling axial holes in the rotor.

15. A rotor for an electrical machine, comprising:
    an axle;
    a rotor pack arranged around the axle; and a plurality of permanent magnet pairs adapted to the rotor pack forming a plurality of magnetic poles, the plurality of permanent magnet poles being arranged in a V-shape having a base-end and a pair of tip-ends, wherein:
- the tip-ends of at least one of the plurality of permanent magnet pairs extend close to the outer circumference of the rotor, and the base-end of the at least one of the plurality of permanent magnet pairs is directed towards the axle, and
- slots extend from close to the tip-ends toward the other one of the tip-ends on the route of the magnetic flux.

16. The rotor of claim 15, wherein:
the slots extend in a direction substantially parallel with the outer circumference of the rotor.

17. The rotor of claim 15, wherein:
the width of the slots decrease towards the center of the V-shape.

18. The rotor of claim 15, wherein:
the ends of the slots located towards the center of the at least one of the plurality of permanent magnet pairs is curved towards the axle.

19. A rotor for an electrical machine, comprising:
an axle;
a rotor pack arranged around the axle; and
a plurality of permanent magnet pairs adapted to the rotor pack forming a plurality of magnetic poles, the plurality of permanent magnet poles being arranged in a V-shape having a base-end and a pair of tip-ends, wherein:
- the tip-ends of at least one of the plurality of permanent magnet pairs extend close to the outer circumference of the rotor, and the base-end of the at least one of the plurality of Permanent magnet pairs is directed towards the axle, and
- slots extend from close to the tip-ends toward the other one of the tip-ends on the route of the magnetic flux, wherein:
- a plurality of slots extend from close to the tip-ends, the slots extending towards the center of the of the at least one of the plurality of permanent magnet pairs, so that the slots close to the same one of the tip-ends are located at an interval from each other in the radial direction of the rotor and that at least one slot on both edges of the pole is essentially parallel with the outer circumference of the rotor.

20. The rotor of claim 19, wherein the slots closer to the outer circumference of the rotor are wider and/or longer than the slots farther away from the outer circumference of the rotor.

* * * * *